(12) United States Patent
Thompson

(10) Patent No.: US 6,295,781 B1
(45) Date of Patent: Oct. 2, 2001

(54) STUD, TOP PLATE, AND RAFTER TIE DOWN

(76) Inventor: Thomas C. Thompson, 92-543 Kokole Pl., Makakilo, HI (US) 96707

( * ) Notice: Subject to any disclaimer, the term of this patent is extended or adjusted under 35 U.S.C. 154(b) by 0 days.

(21) Appl. No.: 09/476,042

(22) Filed: Dec. 31, 1999

Related U.S. Application Data (63) Continuation-in-part of application No. 09/058,764, filed on Apr. 11, 1998, now Pat. No. 6,094,880.

(51) Int. Cl.$^7$ ........................................................ E04B 1/38
(52) U.S. Cl. ............................... 52/712; 52/715; 52/92.2; 52/93.1; 403/232.1
(58) Field of Search .............................. 52/702, 712, 715, 52/92.1, 92.2, 92.3, 93.1, 93.2; 403/231, 232.1, 237

(56) References Cited

U.S. PATENT DOCUMENTS

| | | |
|---|---|---|
| 2,321,221 | 6/1943 | Linehan . |
| 2,413,362 | 12/1946 | Maxwell et al. . |
| 3,188,696 * | 6/1965 | Earhart ................................ 52/712 X |
| 3,256,030 | 6/1966 | Banse . |
| 3,537,221 * | 11/1970 | Helfman et al. .................... 52/702 X |
| 3,972,169 * | 8/1976 | Sheppard, Jr. ........................... 52/702 |
| 4,330,971 * | 5/1982 | Auberger ................................ 52/712 |
| 4,410,294 | 10/1983 | Gilb et al. . |
| 4,572,695 | 2/1986 | Gilb . |
| 4,714,372 | 12/1987 | Commins . |
| 4,841,690 * | 6/1989 | Commins ............................ 52/712 X |
| 5,109,646 | 5/1992 | Colonias et al. . |
| 5,230,198 | 7/1993 | Callies . |
| 5,303,520 * | 4/1994 | Gozdziak ............................... 52/92.2 |
| 5,311,708 | 5/1994 | Frye . |
| 5,335,469 | 8/1994 | Stuart . |
| 5,437,132 * | 8/1995 | Meyers ................................ 52/715 X |
| 5,448,871 | 9/1995 | Newman et al. . |
| 5,560,156 | 10/1996 | McDonald . |
| 5,640,822 | 6/1997 | Haswell . |
| 5,732,524 | 3/1998 | Kalker et al. . |
| 6,094,880 * | 8/2000 | Thompson ............................. 52/712 |
| 6,101,780 * | 8/2000 | Kreidt .................................... 52/712 |

FOREIGN PATENT DOCUMENTS

| | | | |
|---|---|---|---|
| 23942 * | 7/1972 | (AU) ..................................... 52/702 |
| 862969 * | 2/1971 | (CA) ..................................... 52/702 |
| 435226 * | 9/1935 | (GB) ................................. 403/232.1 |

OTHER PUBLICATIONS

Simpson Strong–Tie Co., Inc., "Simpson Strong–Tie Connectors, Wood Construction Connectors", Catalog C–99, 80 pages, Jan. 1999.*

* cited by examiner

*Primary Examiner*—Laura A. Callo

(57) ABSTRACT

A one-piece metal connector that securely ties together the structural members of the roof and wall on a wood frame house. The connector has a vertical web on the top that is attached to a rafter and a vertical web on the bottom that is connected to a wall stud. The connector correctly places each structural member for maximum structural integrity, forming a direct load path. The middle part of the connector has a vertical plate and horizontal tabs that form a box-section around the top plate. Horizontal and vertical tabs form open boxes that hold sheathing tight to the wall. Gussets brace the rafter and stud against racking. The connector has a large surface area for maximum strength, and precise nail holes to avoid splitting the structural member. The connector grasps the structural members to avoid detachment of any structural members during hurricanes and seismic events. The connector's webs and bends help to avoid twisting, lateral forces, thrusting, and uplift.

20 Claims, 9 Drawing Sheets

STUD, TOP PLATE, AND RAFTER TIE DOWN

BACKGROUND-FIELD OF INVENTION

This invention is a continuation-in-part of 09/058,764, filed Apr. 11, 1998, now U.S. Pat. No 6,094,880, and relates to an innovative connector that positively holds together the roof and wall to create buildings that are stronger and more resistant to earthquakes, hurricanes, tornadoes, and strong winds.

BACKGROUND-DESCRIPTION OF PRIOR ART

Background

Recent studies of hurricane damage on wood-frame buildings indicate that the most extensive destruction to a house by strong winds, was when the roof was lifted from the wall, and rain ruined everything in the house.

Seismic forces can shake a house, moving the heavier roof at a different speed than the walls. If the wall and roof are not tied firmly together, these forces can detach the rafters from the top plate causing the walls to buckle and fall.

The roof system provides stability to a house by bracing the tops of exterior and interior load-bearing walls. Sheet metal joints perform better than nailed joints in high winds and during seismic activity. This invention, secured by well placed fasteners, will insure that the major structural members of a house, the roof and walls, are securely tied together.

Hurricanes

After Hurricane Andrew, roofs were blown off buildings, walls were blown out, and many homes were completely destroyed. Toe-nailed connections, missing hurricane clips, and misused, under-secured, or undersize hurricane clips caused most roofs to become detached from the walls.

The engineering staff of the American Plywood Association provided technical personnel to assess the damage from Hurricane Andrew in Florida. The majority of wood structural sheathing failures were attributed to improper connection details, and in every case investigated, the sheathing loss was a result of improper nailing (Keith, 1992).

These problems have not been solved because staples are still used to tie down sheathing, and rafters and trusses are still toe-nailed to the top plate. By looking at new construction, nails can be seen poking through the roof sheathing, completely missing the roof rafter. Most conscientious framers would drive another nail when they felt the nail miss the underlying rafter, but with the new powered nail guns, the framer can not tell if the rafter was missed because each shot feels the same, no matter what the nail is being driven into. This is the same with wall sheathing and wall studs.

Earthquakes

During an earthquake, the wall and roof diaphragms undergo shearing and bending. The shear forces from the roof boundary members are transferred to the top of the shear wall (outside wall) by way of toenails or blocking to the top plate. To withstand and transfer the shear loads, plywood sheets have to be spliced together to prevent adjoining edges from sliding past or over each other (Gray, 1990). This invention prevents the wall sheathing from sliding over or past each other, and ties this sheathing to the top plate, wall stud, and indirectly, to the rafter.

Steel connectors, between different components of a wood-frame buildings superstructure, provide continuity so that the building will move as a unit in response to seismic activity (Yanev, 1974). This invention uses a steel connector to tie the major structural elements of a building together including the rafter, top plate, wall stud, and wall sheathing.

Prior Art

A number of connectors have been developed to tie together the structural members of the roof and wall of a house under construction. Up until this invention, nobody had seen how to make a connector that could tie wall sheathing to these underlying structural members.

The following patents are related to tying structural members of a house together. Linehan's U.S. Pat. No 2,321,221 ties together two intersecting structural members. Maxwell's U.S. Pat. No. 2,413,362 ties together ties together intersecting structural members and resists shear forces. Banse's U.S. Pat. No. 3,256,030 ties together intersecting structural members.

The following patents tie together a rafter and top plate: Gib's U.S. Pat. Nos. 4,410,294 and 4,572,695; Commins' U.S. Pat. No. 4,714,372; Colonias' U.S. Pat. No. 5,109,646; Callies' U.S. Pat. No. 5,230,198; Frye's U.S. Pat. No. 5,311,708; Stuart's U.S. Pat. No. 5,335,469; Mc Donald's U.S. Pat. No. 5,560,156; and Newman's U.S. Pat. No. 5,448,871.

None of the above inventions tie the rafter, top plate, and wall stud together. Haswell's U.S. Pat. No. 5,640,822 and Kalker's U.S. Pat. No. 5,732,524 tie the rafter, top plate, and the weak thin edge of the wall stud together, but they don't tie the wall sheathing to these structural members. The Simpson Strong-Tie Company catalog shows three connectors that tie the rafter, top plate, and wall stud together. Their H2, H15, and H7 can tie each structural member together, but does not clamp the top plate tightly together, nor do they tie the wall sheathing to the structural members.

OBJECTS AND ADVANTAGES

Accordingly, several objects and advantages of my invention are that it helps secure the roof and wall of a building together, to keep the building from being destroyed by hurricanes, tornadoes, and earthquakes.

This invention helps prevent the wall of a building from detaching from the roof during a hurricane. It makes the wall into a stable shear-wall during an earthquake, transferring shear forces into the foundation and ground.

This invention helps prevent the roof rafters or roof trusses from separating from the wall during a hurricane by tying the wall sheathing securely to the underlying top plate and wall stud, transferring lateral and uplift forces to the walls and to the foundation, without sliding or detaching. It also makes sure that any forces transferred from the roof can be managed by the wall and transferred properly to the ground.

During an earthquake or a hurricane, a building with my invention will keep the roof and walls together as a sturdy unit, resisting and transferring destructive forces to the ground.

Mounted on the wall sheathing, wall stud, top plate, and rafter, my invention resists uplift, the most destructive force during a hurricane. During an earthquake, when my invention is mounted on the roof and walls, they will turn each member into a shear-wall, with high resistance to racking. This would improve the house beyond existing building codes, as sheet metal joints have been proven to perform better than nailed joints during hurricanes and earthquakes.

Another object of this invention is the large surface area which prevents the wood from splitting during nailing or during uplift or racking forces. The large surface area provides more strength in the connecting or hold-down process.

Still another advantage is the accurately placed nail holes on the invention. These nail holes prevent nails from splitting the underlying rafter and stud, by making the framer place nails at the correct and accurate location. The accurate nail holes also prevent splitting of the wall sheathing.

Another advantage is that the nails are driven into the strong broad-side of a rafter, stud, or joist. The invention also wraps around three sides of the top plate, forming a very strong connection and preventing the two plates of the top plate from pulling apart.

Yet another advantage of this invention is during earthquakes, nails can sometimes bend with the movements of the house, but screws often break. Even though screws hold tighter than nails and provide a tight connection against uplifting forces from hurricanes, they are less resistant against earth movements. This invention absorbs and transmits most of the forces during an earthquake and hurricane so nails and/or screws can be used as fasteners.

Another advantage is that since the invention absorbs and transfers earthquake and hurricane forces, less nails and nailing could be used. Also, screws could be used in the invention in earthquake areas with less fear that the heads will shear off.

Previously, only nails had to shear, but this entire connector must be sheared for the invention to fail. With this strong connector, rafters will not have to be "birds-mouthed" to fit on the top plate. A birds-mouth weakens the rafter and requires a skilled and expensive carpenter.

Still another advantage is that with the wall sheathing firmly attached to the rafters, wall material will now have a better chance of staying on during strong winds and earth movements. In addition, with the sheathing now firmly connected, new materials may be attached to the wall, such as solar electric panels, without fear of them being blown off with the sheathing.

In areas with brush or forest fire danger, fire-proof material or heavy material, such as tile, stone or metal, can now be applied to the wall with less danger of being blown or shaken off during earth tremors or high winds. With a very strong connection between the roof and wall, heavier loads can be placed on the roof.

Since the walls are now more resistant to racking, heavy fire-proof materials such as stucco or brick veneer can be applied to the wall sheathing with less chance of being shaken off during earth movements.

Earth tremors and hurricanes always destroy the weakest parts of a house. By making each envelope of a house, the vertical walls and roof into a strong unit, there will be less damage.

Another advantage is that the building contractor or a building inspector can visually inspect the roof and wall for this connector, and can be assured that all the nails have been correctly placed. Previously, a visual inspection could not determine if the roof and wall was properly secured.

It is a further object of this invention that it easily, quickly, and economically protects houses from the destructive forces of earthquakes and hurricanes. It is a still further object that the connector is strong, attractive, permanent, functional, uncomplicated, simple to manufacture, easy to install, and economical. All of the embodiments can be made from a single sheet metal blank, without any welding.

A further object is that this invention can be used on various size sheathing, rafters, roof trusses, studs, wood or metal I-beams, TJI, and glue-lams, all made from wood or metal. There may be insurance discounts for homeowners who have this invention installed on their houses.

Previously, architects, engineers, and builders did not know how important the attachment of the roof to the top plate and wall stud was for transferring forces during a hurricane or earthquake. It was thought that the weight of the roofing material would keep the roof attached during a storm. Prior to this invention, no thought had been given to having the roof and wall so tightly connected together, that they would form a shear wall during an earthquake, forming a continuous load path from the roof to the foundation.

Another advantage is that the rafter and wall stud will now line up to form a direct load path for uplift, thrust, and lateral loads. The metal connector will help direct and absorb these loads to make a house much more resistant to hurricanes and earthquakes.

Another advantage is that the invention and embodiments can be made from a single tool and die saving costs.

These and other objectives of the invention are achieved by simple and economical connectors that allow a builder to quickly and easily secure the weakest parts of a building against earth tremors and high winds.

Advantages of each will be discussed in the description. Further objects and advantages of my invention will become apparent from a consideration of the drawings and ensuing description.

REFERENCE NUMERALS

10. Anchor clip
11. Rafter web
11A. Rafter bend
12. Plate tab
12A. Top plate bend
13. Main plate
14. Plate web
14A. Bottom plate bend
15. Stud tab
15A. Stud bend
16. Face
17. Nail holes
18. Gusset clip
19A. Top curve cut
19B. Lower curve cut
20A. Top gusset
20B. Lower gusset
21. Sheathing tab
21A. Sheathing bend 21B Horizontal stop
22A. Right cut
22B. Top cut
22C. Left cut
23. Sheathing clip
24. Sheathing clamp
25. Sheathing web
25A Vertical stop
26A. First bend
26B. Nail holes
26C. Nail slots
27. Nail holes
28A Top stabilizer
28B Lower stabilizer
29 Nail holes
30 Nail slots
R Rafter
S Wall stud
T1 Upper plate of top plate
T2 Lower plate of top plate
W Wall sheathing

DESCRIPTION

Figure 1:
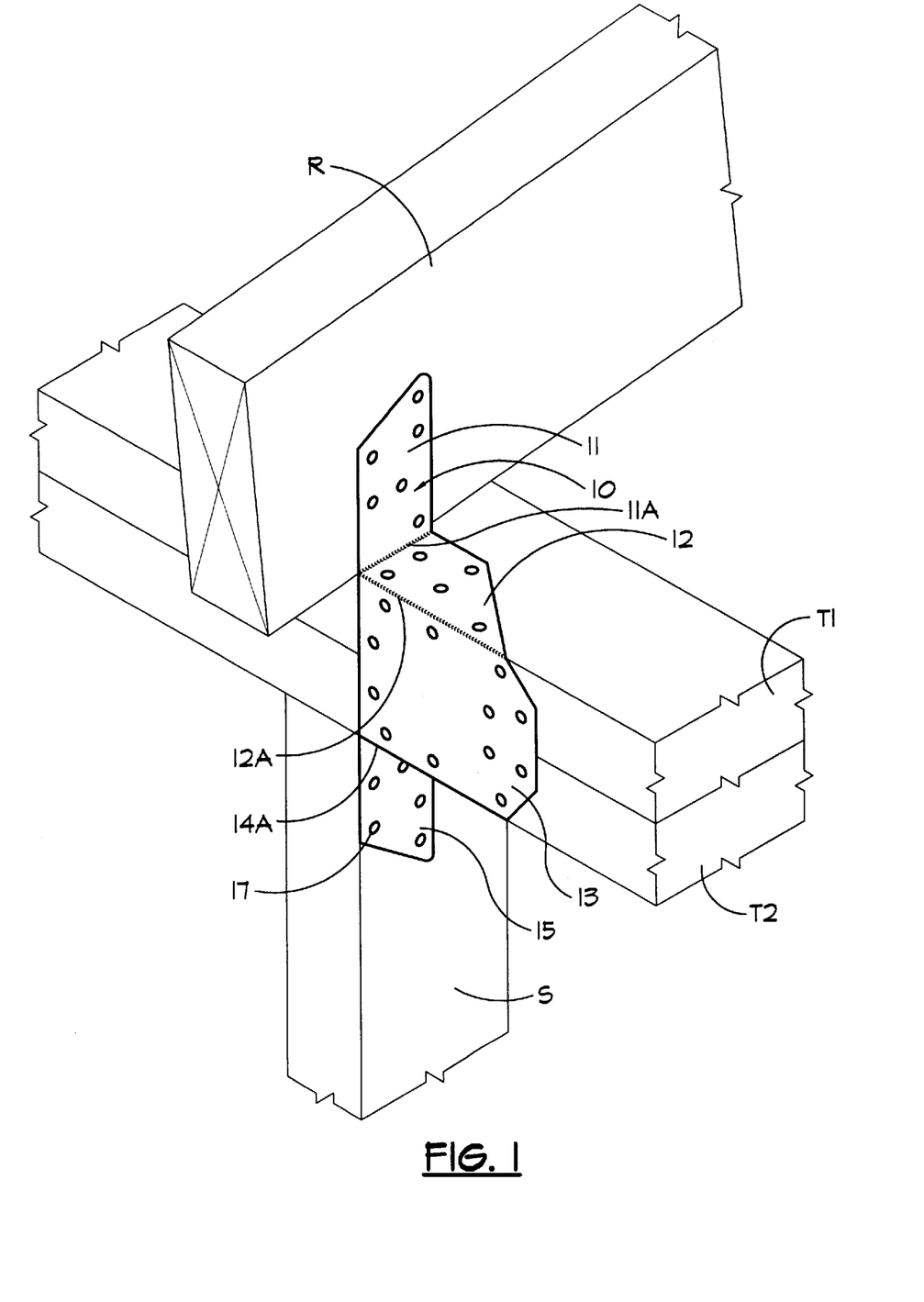
FIG. 1 shows a perspective view of an installed anchor clip.

FIG. 1

FIG. 1 shows a perspective view of an anchor clip that positively aligns and ties together a rafter, top plate and wall stud. The anchor clip 10 consists of a rafter web 11 on the top, connected to a plate tab 12 by a right-angle bend known as a rafter bend 11A.

The plate tab 12 is connected to the main plate 13 by a right-angle bend known as a top plate bend 12A. The rafter bend 11A and top plate bend 12A are perpendicular to each other.

The main plate 13 has a mirror-image of the plate tab 12 and rafter tab 11 on the bottom side which are known as the stud tab 15 and plate web 14 respectively. The stud tab 15 is connected to a plate web 14 by a right-angle bend known as a stud bend 15A.

The plate web 14 is hidden in this view, but is connected to the main plate 13 by a right-angle bend known as a bottom plate bend 14A. The stud bend 15A and bottom plate bend 14A are perpendicular to each other. There are numerous nail holes 17 on the anchor clip 10 for attachment to each structural member.

Refer now to FIG. 1 which shows how an anchor clip 10 ties together a rafter R, both plates of a top plate T1 and T2, and a wall stud S. The rafter web 11 is shown attached to the wide side of the rafter R. The plate tab 12 is attached to the top part of the top plate T1.

The main plate 13 is attached to the front face of the top plate T1 and T2, and the plate web 14, hidden in this view, is attached to the bottom of the top plate T2. The stud tab 15 is attached to the wall stud S.

The anchor clip 10 secures both plates T1 and T2 of the top plate together. The plate tab 12, main plate 13, and plate web 14 wrap around three sides of the top plate T1 and T2 forming a box-like section.

Previously, when the structural top plate dried, the individual plates T1 and T2 could warp, twist, cup, and shift away from each other. This could also move the top plate T1 and T2 away from the rafter R and wall stud S. This movement could cause cracking of sheet rock and plaster inside the house, and cause cracking of bricks, siding, or outside stucco.

If the rafter R, top plate T1 and T2, and wall stud S are warped slightly away from each other, their structural strength decreases. With an anchor clip 10 attached to each structural member, the top plate T1 and T2 is clamped in a box-like section preventing any movement.

Installation is simple and can be done with the wall on the ground or raised. When the stud tab 15 is attached to the wide side of the wall stud S, the box-section around the top plate T1 and T2 will prevent lateral movement of the wall. This lateral movement or racking of the wall can throw the wall out of square. The walls are usually lifted into place before the outside wall sheathing is installed, hence they will stay square with an anchor clip 10 in place.

Since most walls are assembled on the ground, nails or screws can be easily installed through the nail holes 17 into the wall stud S and top plate T1 and T2. The wall can be lifted and sheathing can be installed over the anchor clips 10. Previously, with sheathing applied to the walls to prevent racking, the wall was too heavy to lift without mechanical means.

When the wall studs S are correctly spaced, such as 24-inches-on center, the rafters R can automatically be spaced the same, when they are attached to the rafter web 11. The rafter web 11 of the anchor clip 10 is shown attached to the wide side of the rafter R. This places the rafter R directly over the wall stud S.

By placing the rafter R directly over the wall stud S, it forms a direct load path. Thus the weight of the roof is placed directly on the top plate T1 and T2 and on to the wall stud S directly to the sill plate and foundation.

The anchor clip 10 prevents any movement of the rafter R. The rafter R is prevented from twisting left or right because of the strong connection to both plates T1 and T2 of the top plate. Previously, the rafter R was only attached to one plate T1 of the top plate using toe-nailed nails or weak prior art.

The anchor clip 10 prevents the rafter R from thrusting or moving toward the outside of the house. Previously, the rafter had to be cut in the shape of a bird's mouth in order to seat on to the top plate T1 so they could be toenailed together. The toe nails are always driven into the edge of the rafter catching a very small fraction of the available wood and only the top plate T1 of the top plate T1 and T2.

The bird's mouth cut severely weakened the wood, and prevented thrusting as long as the toe nailed connection stayed together, but doesn't prevent the wall from bowing out. The anchor clip 10 prevents thrusting and bowing out of the wall without weakening the rafter.

Actually, the anchor clip 10 helps strengthen the rafter R by preventing splitting along the long dimension. Even if the rafter R should split due to extreme wind uplift or seismic forces, the anchor clip 10 will help hold the rafter R together.

During hurricanes, winds blowing parallel to the wall create a strong negative pressure causing the wall studs S to bow out and separate from the top plate T1 and T2 and collapse. The anchor clip 10 prevents the wall stud S from moving outward on this side and the leeward side of the house because the rafter R and top plate T1 and T2 are now connected to the wall stud S.

Hurricane winds blowing perpendicular to a wall creates a positive pressure, trying to push the wall into the house. The anchor clip's 10 strong attachment to the rafter R prevents the wall stud S and top plate T1 and T2 from moving inward.

Wind blowing over the roof creates a negative pressure that lifts the roof, along with the wind that lifts up the overhanging rafters on the windward side of the house. The anchor clip 10 securely ties the rafter R to the top plate T1 and T2 and wall stud S preventing uplift.

During earthquakes, research has shown that there is an upward movement followed by shaking. The upward movement can move the walls and roof at different speeds due to the weight difference. Previously, this would cause the rafters R and/or the wall studs S to separate from the top plate T1 and T2, or the two plates T1 and T2 to disconnect. The anchor clip 10 ties the roof rafters R securely to the wall, so the roof and wall move as one unit, preventing detachment.

The shaking movement of an earthquake can move one wall in and out and the adjacent wall left and right as a lateral movement. With an anchor clip 10 securing the rafter R tightly to the top plate T1 and T2 and wall stud S, in and out movement or thrusting is contained.

Lateral forces on a house tend to rack the walls. Small earth movements can crack the walls, dislodge clay tiles from the roof, and break windows. Large seismic movements can destroy the house. With the plate tab 12, main plate 13, and pLate web 14, of the anchor clip 10, forming a box-section around the top plate T1 and T2, and the rafter web 11 and stud tab 15 firmly attached to the rafter R and wall stud S, racking or lateral movement is prevented and damage is minimized.

FIG. 1 shows an anchor clip 10 installed on the right side of a rafter R and wall stud S. An anchor clip 10 can be installed on the left and/or right side of a rafter R and wall stud S. The right side of the rafter R shows the same anchor clip 10 as shown on FIG. 3. Turning an anchor clip 10 upside-down, allows it to fit on the left side of the rafter R. By placing an anchor clip 10 on both sides of the rafter R, the strength of the rafter R, top plate T1 and T2, and wall stud S connection is amplified.

The ability of the anchor clip 10 to fit on either side of a rafter R without the need of making a left and right clip is an advantage over prior hurricane clips. Only one tool and die is needed. The anchor clip 10 can also fit on the back or inside part of the rafter R, top plate T1 and T2, and wall stud S connection. One can put one or two anchor clips 10 on the front or rear, and can also use a combination of an anchor clip 10 on the front and one on the rear. One can also put anchor clips 10 on the front and rear using three or four anchor clips 10.

Figure 2:
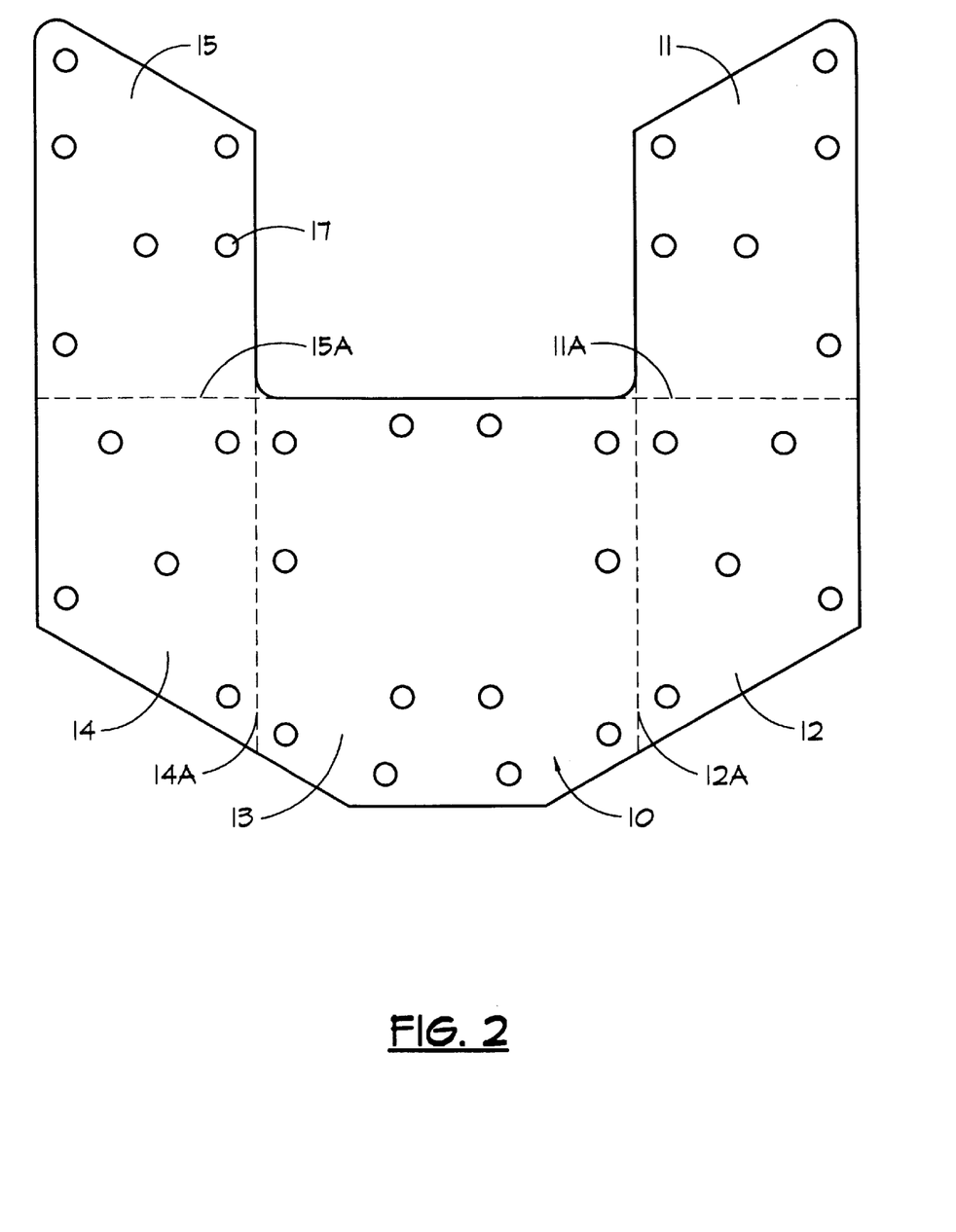
FIG. 2 shows a flat pattern layout of an anchor clip.

FIG. 2

Refer now to FIG. 2 which shows a flat pattern layout of an anchor clip 10 prior to bending. It can be seen that the left part of the clip can nest with the right part of the clip. During manufacture, there is very little waste of material because the present invention can nest.

The rafter web 11 and stud tab 15 can be bent up along the rafter bend 11A and stud bend 15A. Then the plate tab 12 and plate web 14 can be bent down along the top plate bend 12A and bottom plate bend 14A respectively.

This bending forms an open box shape between the plate tab 12, main plate 13, and bottom plate 14. This bending also forms the rafter web 11 and stud tab 15 parallel to each other.

Figure 3:
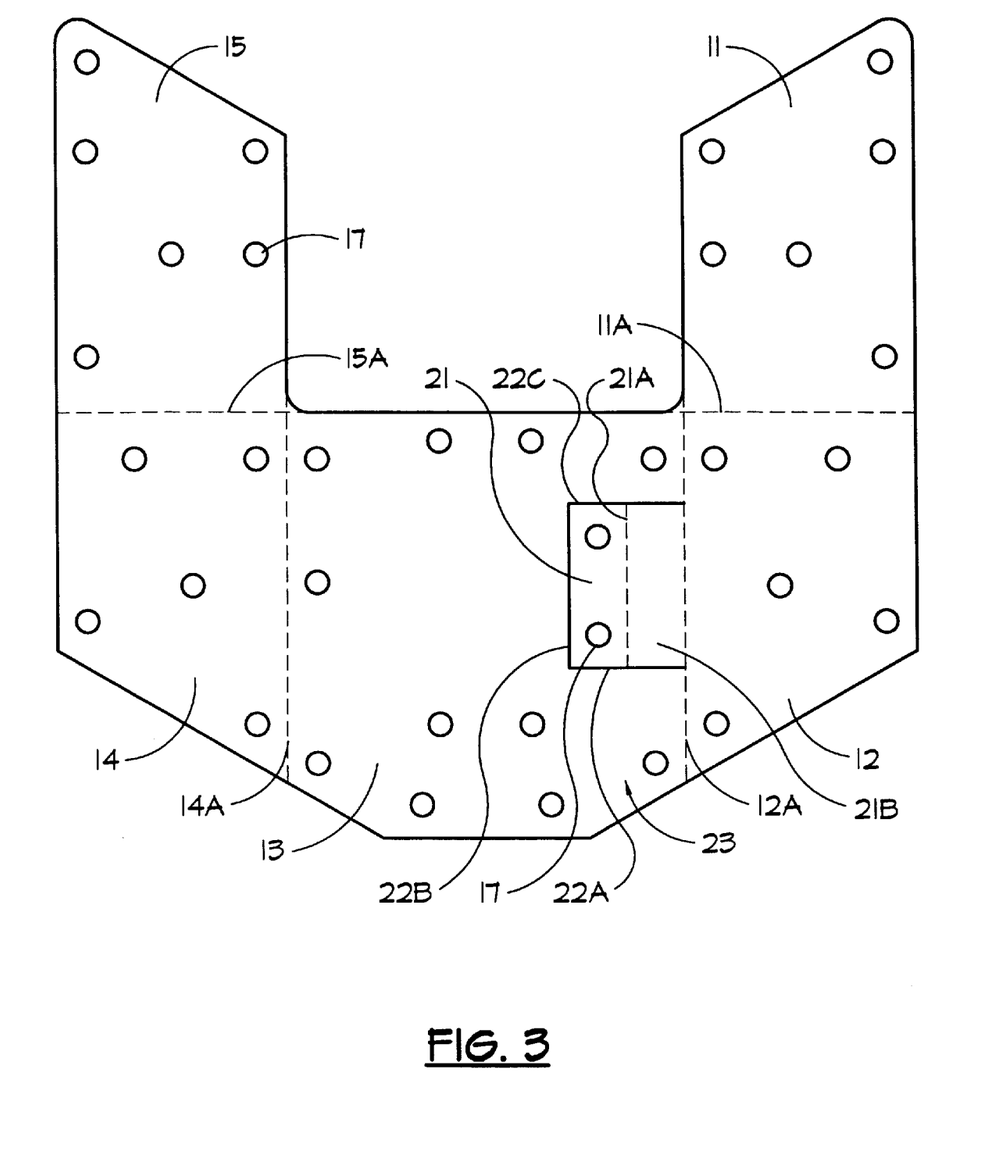
FIG. 3 shows a flat pattern layout of a sheathing clip.

FIG. 3

Refer now to FIG. 3 which shows a flat pattern layout of a sheathing clip 23. The sheathing clip 23 is similar to an anchor clip 10 except for a sheathing tab 21. The sheathing tab 21 is formed by the vertical right cut 22A and left cut 22C, and the horizontal top cut 22B. The sheathing tab 21 is folded up 90° along the top plate bend 12A, then folded down 90° along the sheathing bend 21A, forming a horizontal open box-section.

The horizontal stop 21B forms the top of the box, with the sheathing tab 21 forming the outside of the box, and the main plate 13 forms the inside of the box. The box is open toward the bottom, where the wall sheathing can be inserted. By forming a box-section on the top edge of the sheathing, cracking, delaminating, and splitting of the sheathing is diminished.

Wall sheathing on the outside wall can be slid under the sheathing tab 21 and nailed to the top plate T1 through nail holes 17 on the sheathing tab 21. This places the sheathing up against the upper part of the top plate T1. Since Oriented-Strand-Board (OSB) and insulated board is used frequently for sheathing instead of plywood, the sheathing clip 21 will help hold the sheathing securely to the wall. Sheathing can still be stapled to the studs and top plate in many states. Staples are thin and can rust and pull out when subjected to lateral and outward forces. The sheathing clip 21 will hold the sheathing tight if staples are overwhelmed by pressure.

Figure 4:
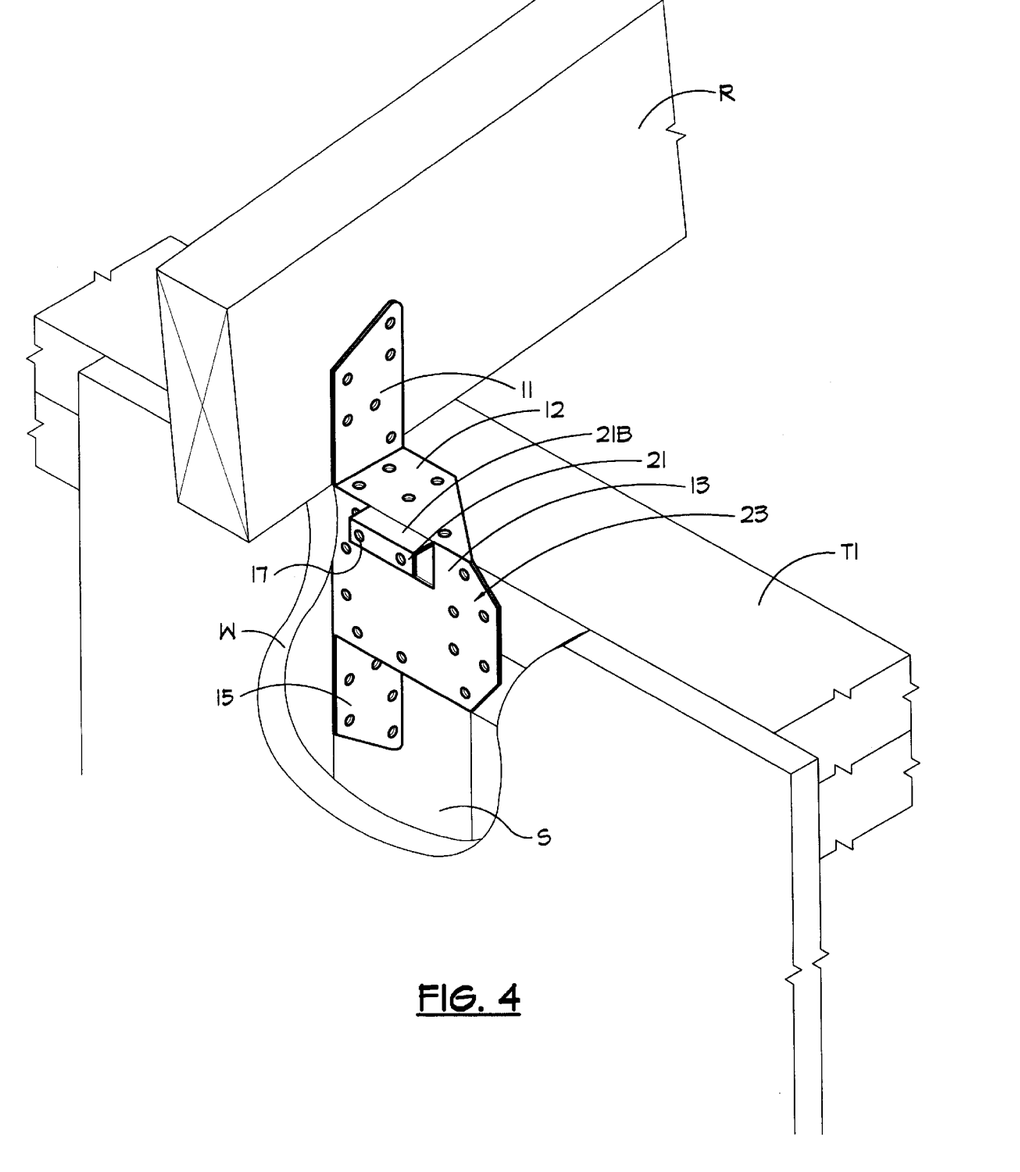
FIG. 4 shows a perspective view of an installed sheathing clip.

FIG. 4

Refer now to FIG. 4 which shows a sheathing clip 23 installed on a house. The sheathing W can be installed before the rafters R are installed. The sheathing clip 23 will prevent a wall from racking before the wall sheathing W is installed. The sheathing W is cut away around the sheathing clip 23 for clarity.

When a sheathing clip 23 is installed on a rafter R, top plate T1 and T2, and wall stud S, and sheathing is installed in the sheathing tab 21, the sheathing is directly connected to the upper plate T1 of the top plate, and indirectly connected to the rafter R, lower plate T2, and wall stud S. The sheathing tab 21 can be formed on the lower part of the main plate 13, like a mirror image so the sheathing clip 23 can be used on the left side of a rafter R The sheathing tab 21 could also be formed slightly lower down on the main plate 13, which places the sheathing tab 21 lower so that when sheathing is slid underneath it will not go to the top of the top plate. This allows room above the sheathing in case a bird's mouth is called for on a rafter. The sheathing will still be attached to the upper plate T1 of the top plate.

When the sheathing is connected to a sheathing tab 23 and is also connected normally to the top plate T1 and T2, and wall studs S by nailing, the wall can now truly be a shear wall. Any seismic forces can now be absorbed and transferred by the sheathing to the roof and foundation. Previously, the connection between the wall sheathing, wall stud, top plate, and rafter was just nails and staples which are too weak to absorb and transmit seismic forces without cracking, breaking, or disconnecting. Prior hurricane clips did not tie each structural member tightly together with the wall sheathing.

New research on hurricanes and tornados shows that the intense negative pressure generated by the winds blows out the roof and walls. A classic picture on TV is of a roof being blown off the walls by a hurricane. The roof stays together showing that the roof is strong, but the attachment to the wall is weak. Anchor clips 10 and sheathing clips 23 will make a connection much more resistant to wind and seismic forces.

Figure 5:
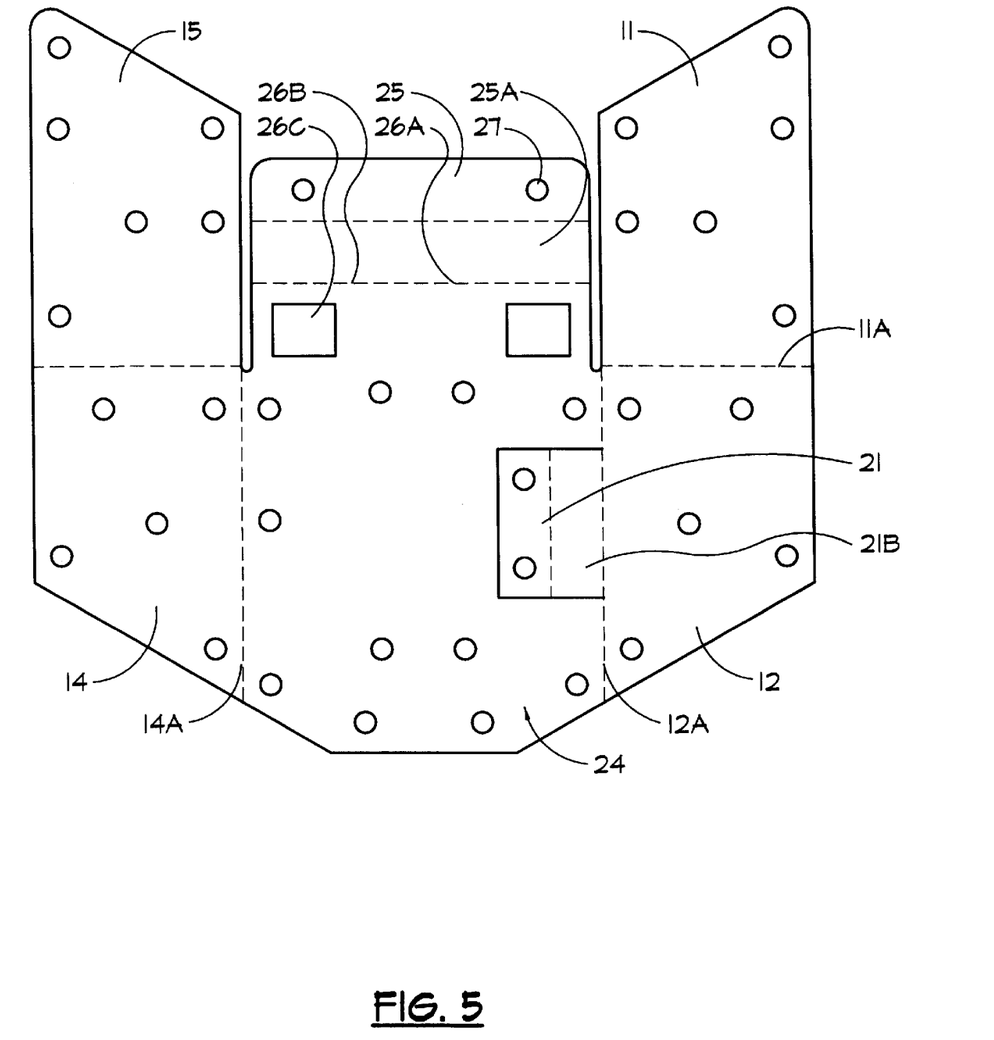
FIG. 5 shows a flat pattern layout of a sheathing clamp.

FIG. 5

Refer now to FIG. 5 which shows a flat pattern layout for a sheathing clamp 24. The sheathing clamp 24 is similar to a sheathing clip 23 except for the added sheathing web 25. The sheathing web 25 consists of extra material on the left side of the main plate 13, as shown.

There are two vertical bends by the sheathing web 25. The first bend 26A is bent up 90°, and the second bend 26B is bent up 90°. This forms a vertical open box-section, with the sheathing web 25 on top, the vertical stop 25A on one side, and the main plate 13 with nail slots 26C on the bottom. The vertical edge of sheathing W can be inserted from the open end of the box-section. Nails can be driven through the nail holes 27, into the sheathing, and through the nail slots 26C, into the underlying top plate T1 and T2.

When installed on a building, the second bend 26B is above the midpoint of the wall stud S. This is important because when sheathing is placed into the sheathing web 25, the edge of the sheathing will be along the midpoint of the wall stud S. By having the sheathing along the midpoint of the wall stud S, the maximum amount of sheathing, ¾ inch, will automatically be placed on the ½ inch-wide wall stud. The thickness of the sheathing web 25 will automatically space sheets of sheathing apart to prevent warping during expansion and contraction of seasonal changes. The nail holes 27 on the sheathing web 25 are spaced about ⅜ inch from the first bend 26A, making the driven nails automatically go into the "meat" of the wall stud S.

Figure 6:
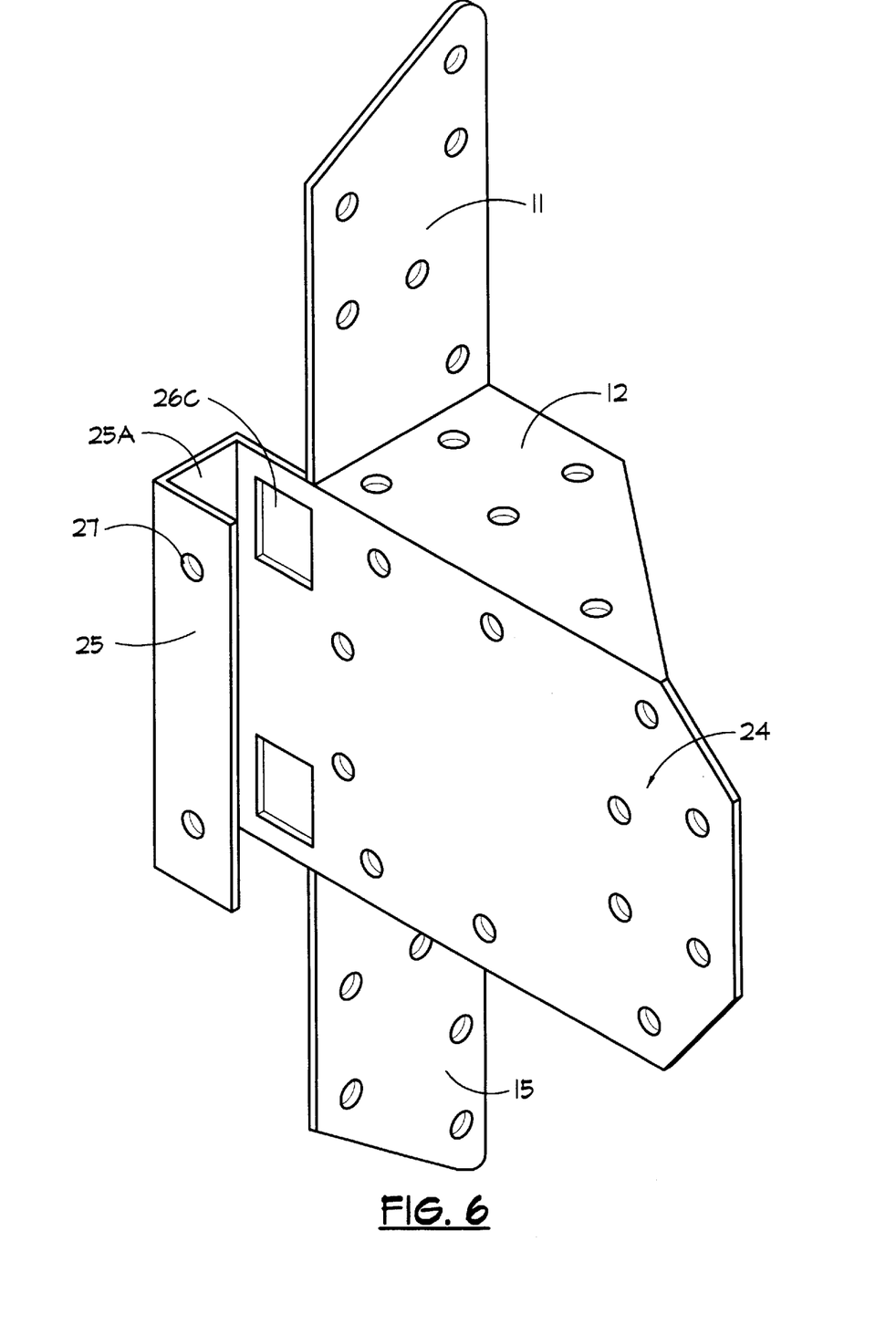
FIG. 6 shows a perspective view of a sheathing clamp.

FIG. 6

Refer now to FIG. 6 which shows a perspective view of a sheathing clamp 24 after bending. It can be seen that the vertical stop 25A is to the left of the rafter web 11 and stud tab 15. When the vertical edge of wall sheathing W is placed under the sheathing web 25 to the vertical stop 25A, the vertical edge of wall sheathing W will be along the center-line of the wall stud S. Nails or screws can then be driven into the nail holes 27, through the wall sheathing W, through the nail slots 26C, and into the top plate T1 and T2.

No sheathing tab 21 is shown on this sheathing clamp 24, but a sheathing tab 21 could be stamped on the top or bottom of this sheathing clamp 24. If the sheathing tab 21 is stamped as shown on FIG. 5, then this would be a right-handed sheathing clamp 24. If the sheathing tab 21 is stamped on the bottom, then this would be a left-handed sheathing clamp 24.

Figure 7:
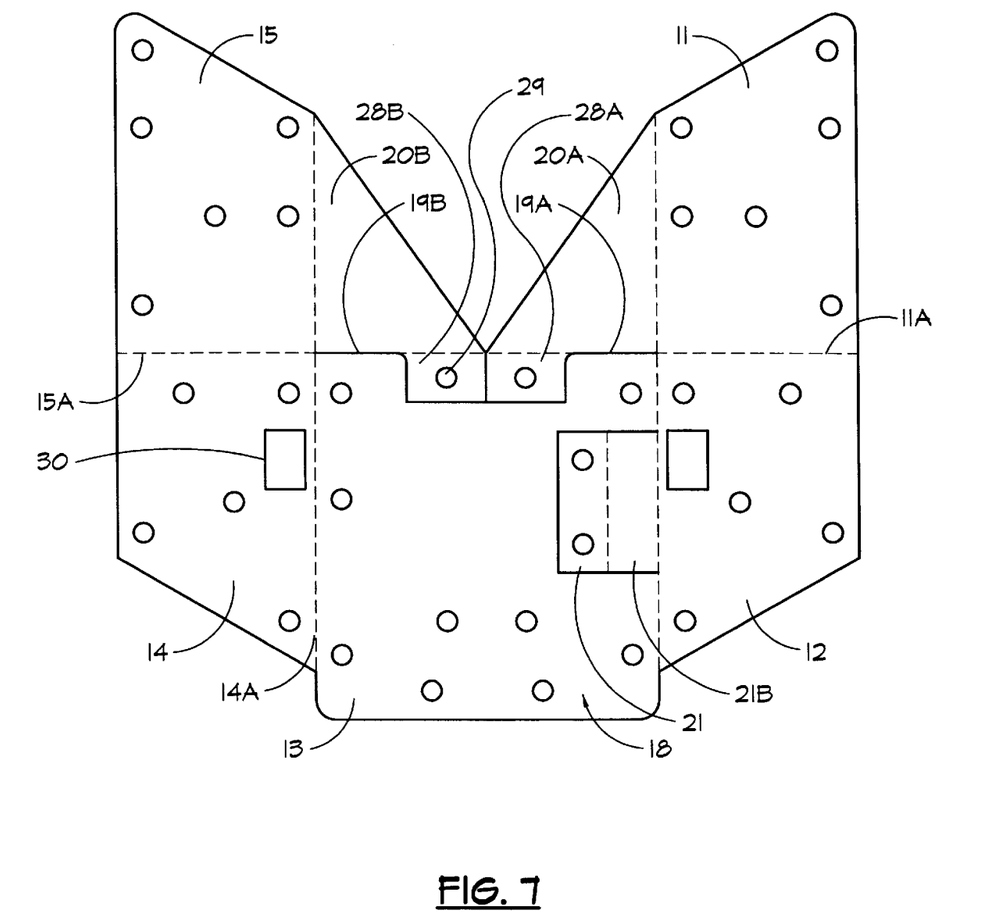
FIG. 7 shows a flat pattern layout of a gusset clip.

FIG. 7

Refer now to FIG. 7 which shows a flat pattern layout of a gusset clip 18 which is essentially the same as an anchor clip 10 shown in FIG. 2, except for the top gusset 20A and lower gusset 20B, which are connected to the rafter web 11 and stud tab 15 respectively.

The top curve cut 19A forms a top gusset 20A and top stabilizer 28A. The lower curve cut 19B forms a lower gusset 20B and lower stabilizer 28B. The rafter web 11 and stud tab 15 are bent up 90° along the rafter bend 11A and stud bend 15A, along with the attached triangular-shaped top gusset 20A and lower gusset 20B. This forms the top stabilizer 28A and lower stabilizer 28B perpendicular to the top gusset 20A and lower gusset 20B.

The plate tab 12 is bent 90° along the top plate bend 12A and the plate web 14 is bent down 90° along the bottom plate bend 14A. The top gusset 20A is bent toward the main plate 13 about 90°, which places the nail hole 29 on the top stabilizer 28A over the nail slot 30 on the plate tab 12. The lower gusset 20B is bent toward the main plate 13 about 90°, which places the nail hole 29 on the lower stabilizer 28B over the nail slot 30 on the plate web 14.

When the gusset clip 18 is installed on a rafter, top plate, and wall stud, nails or screws inserted into the nail hole 29 of the top stabilizer 28A and driven through the nail slot 30 plate tab 12 will hold the top gusset 20 securely against the plate tab 12. The top gusset 28A can not move, which braces the rafter web 11 from any lateral movement. The same is true for the lower gusset 28B when the lower stabilizer 28B is secured to the plate web 14. The gussets 28A and 28B form buttresses that are highly resistant against bending, especially if gusset clips 18 are used on both sides of the rafter.

On the top part of the gusset clip 18, the rafter web 11, top gusset 20A, and top stabilizer 28A on the plate tab 12 forms a strong open box-section able to resist thrusting, uplift, and lateral movements. The stud tab 15, lower gusset 20B, and lower stabilizer 28B on the plate web 14 also forms a strong box-section on the lower part of the gusset clip 18.

Figure 8:
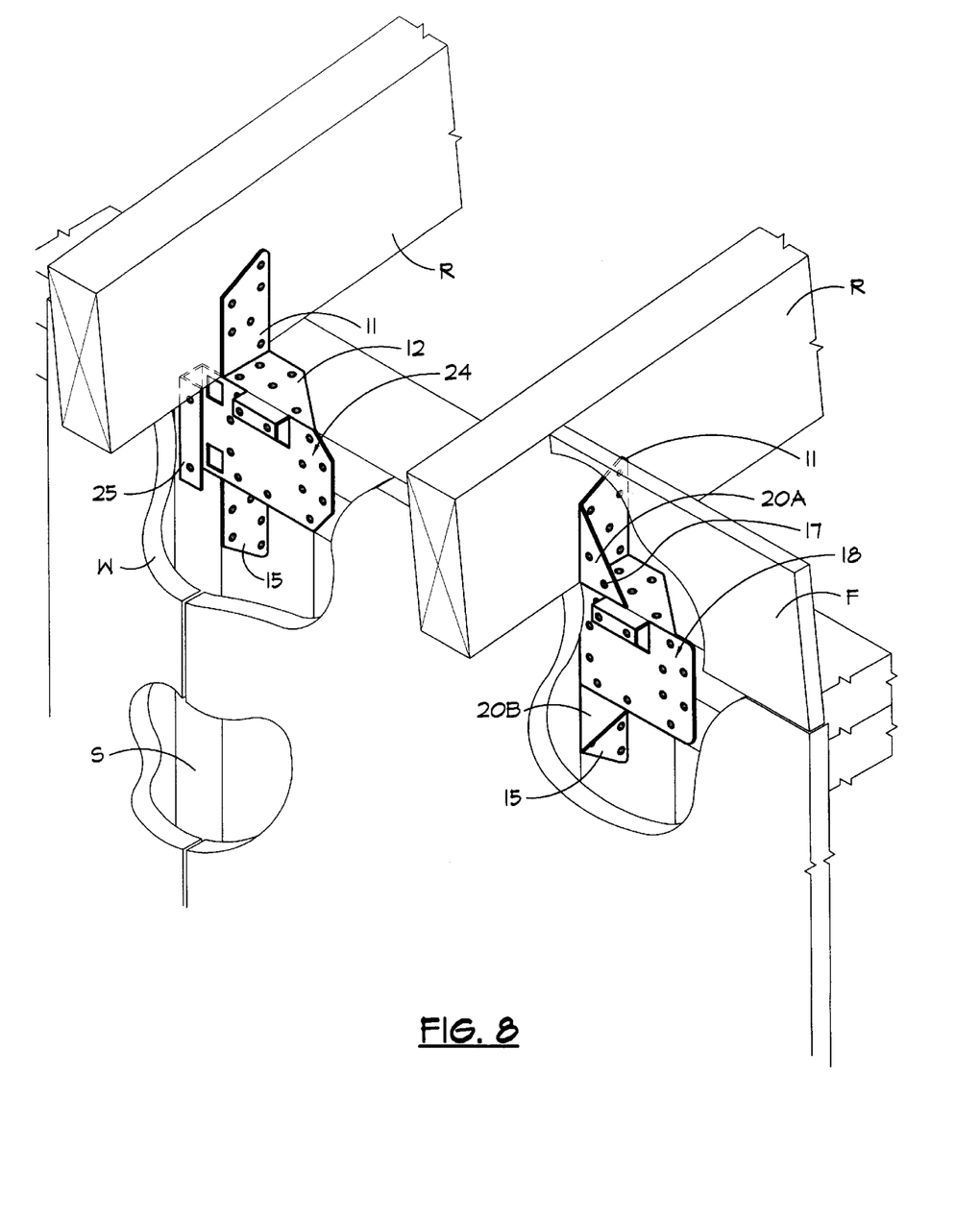
FIG. 8 shows a perspective view of an installed gusset clip and sheathing clamp.

FIG. 8

Refer now to FIG. 8 which shows a perspective view of a right-handed gusset clip 18 attached to the structural members of a house along with a sheathing clamp 24. The gusset clip 18 is on the right. This view shows the triangular shape of the top gusset 20A and lower gusset 20B, and how they brace the rafter web 11 and stud tab 15 preventing any lateral movement.

The horizontal edge of wall sheathing W is shown attached to the sheathing tab 21 on the gusset clip 18. The wall sheathing W is cut away for clarity. A frieze board F or blocking has been inserted between the rafters R, against the top gusset 20A and secured with nails through the nail holes 17 on the top gusset 20A. Part of the frieze board F has been cut away for clarity.

On the left, a right-handed sheathing clamp 24 is attached to the structural members of a house along with the vertical and horizontal edges of wall sheathing W. Two vertical edges of wall sheathing meet at the sheathing clamp 24 and these edges are automatically centered on center-line of the wall stud S when the right sheet is placed under the sheathing web 25 and against the vertical stop 25A. The thickness of the vertical stop 25A separates the two sheets of sheeting W to prevent buckling. The vertical stop 25A and sheathing web 25 prevent the edges of sheathing W from riding over each other during lateral loads.

Figure 9:
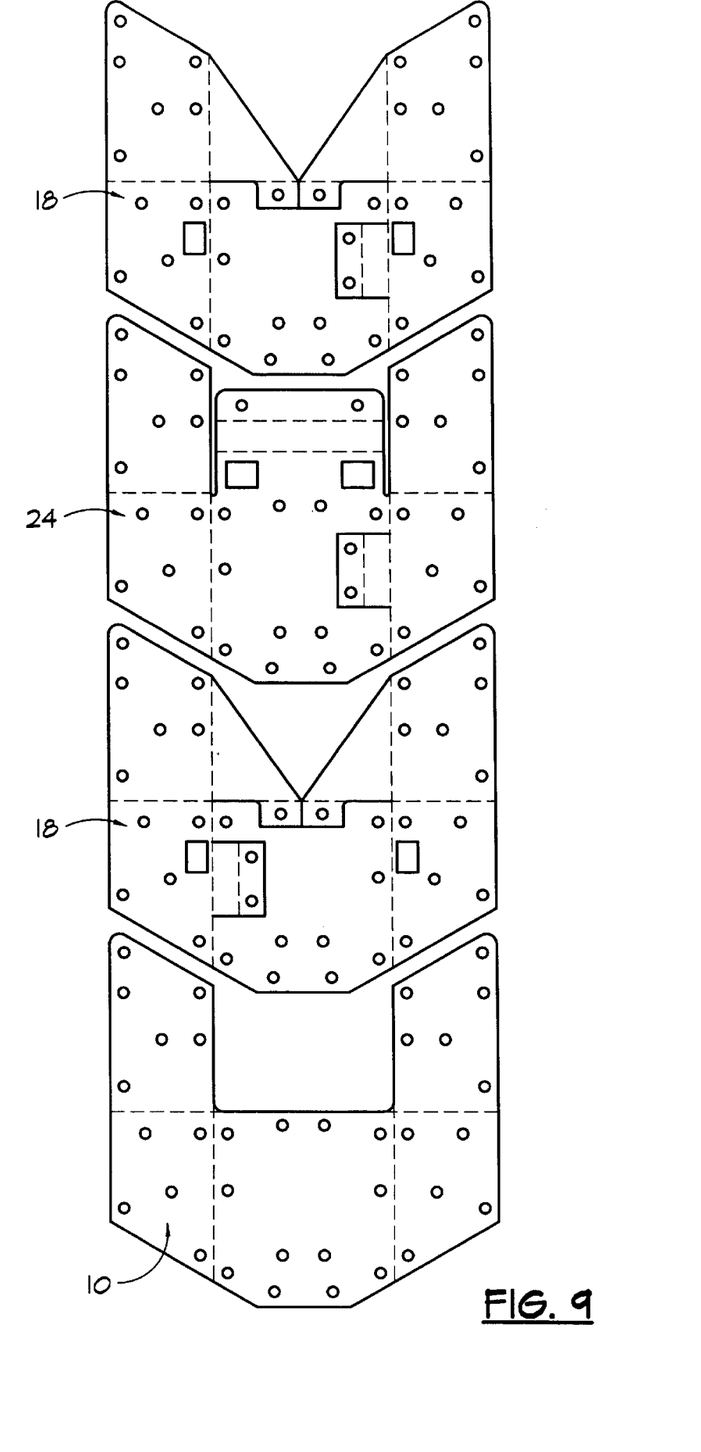
FIG. 9 shows a flat patterns for tool and die.

FIG. 9

Refer now to FIG. 9 which shows that the tool and die can be changed slightly and inexpensively to form each embodiment. By moving pins the nail holes can be changed. Lancing and piercing of sheathing tabs can be easily changed on the die by using standard tool and die methods. There is little waste of material because of the nesting of the layouts. Bending can be done by standard tool and die methods.

From the left, the gusset clip 18 is right-handed. The sheathing clamp 24 is right-handed. The next gusset clip 18 is left-handed. The anchor clip 10 does not have any sheathing tabs 21, but they could be inserted.

CONCLUSION, RAMIFICATIONS, AND SCOPE

Thus, the reader will see that the invention provides a simple and economical connector that allows a builder to quickly, easily, and accurately secure the walls and roof of a building against earth tremors and high winds.

While my above description contains many specificities, these should not be construed as limitations on the scope of the invention, but rather as an exemplification of preferred embodiments thereof. Many other variations are possible.

There can be minor variations in size, and materials. For example, the ties can have more rounded corners, squarer corners, wavy lines instead of straight lines, more nail holes, slightly less nail holes, or be thicker or thinner, wider or longer. The ties can be made for 2×4's, 2×6's, 2×8's, trusses, glue-lams, timbers, logs, beams, steel, and other structural member combinations.

The ties can have different dimensions to fit the particular plans of the engineer and architect. In areas that have high winds or earthquakes, the ties could be thicker, wider, or have more nail holes. There could be more or less ties on each rafter, from one to four ties, depending on if they are installed on the inside of the building.

The ties can hold down boards instead of sheathing, they can also hold down insulated sheets or metal sheets. In instances where the studs are warped, twisted, or bowed, the ties can help straighten them by securing the plywood down tightly with screws.

The ties can be made of metal by stamping, forging, or casting. The ties can be made of plastic, by molding or casting. The ties can be made of recycled materials. The ties can be made with bright colors, so a builder or inspector knows they are in position.

Accordingly, the scope of the invention should be determined not by the embodiments illustrated, but by the appended claims and their legal equivalents.

I claim:

1. A metal connector for securing a rafter, top plate, and wall stud comprising:
   a. a generally flat main plate;
   b. a first generally right angle bend on said flat plate forming a plate tab;
   c. a second generally right angle bend adjacent and perpendicular to said first bend forming a rafter web having an angled free edge;
   d. a third generally right angle bend on said flat plate, opposite said first right angle bend, forming a plate web;
   e. a fourth generally right angle bend, adjacent and perpendicular to said third right angle bend, forming a stud tab having an angled free edge.

2. The connector of claim 1 wherein said plate tab, said main plate, and said plate web having said right angle bends, a predetermined area, and a plurality of nail holes as a means for forming a strong box section on three sides of said top plate and having attaching means to said top plate thereby preventing beams of said top plate from separating.

3. The connector of claim 1 wherein said main plate having said right angle bends forming said rafter web and said stud tab parallel and planar to each other.

4. The connector of claim 1 wherein said rafter web and said stud tab having angled free ends and a predetermined area as a means for avoiding sloping roofs, and as a means for placement on different sides of a rafter, top plate, and stud.

5. The connector of claim 1 wherein said rafter web and said stud tab having a plurality of nail holes and said right angle bends as a means for placement and attaching means against the wide side of a rafter and wall stud, thereby forming a direct load path between said rafter and said wall stud.

6. A metal connector for securing a rafter, top plate, wall stud, and wall sheathing comprising:
   a. a generally flat main plate;
   b. a first generally right angle bend on said flat plate forming a plate tab;
   c. a second generally right angle bend adjacent and perpendicular to said first bend forming a rafter web;
   d. a third generally right angle bend on said flat plate, opposite said first right angle bend, forming a plate web;
   e. a fourth generally right angle bend, adjacent and perpendicular to said third right angle bend, forming a stud tab;
   f. fifth and sixth right angle bends on said main plate forming a sheathing tab.

7. The connector of claim 6 wherein said right angle bends forming said sheathing tab having attachment to said main plate and to each other, and being generally parallel, thereby forming an open box section.

8. The connector of claim 7 wherein said open box shaped sheathing tab having a predetermined area and attaching means for holding sheathing to said connector and underlying structural members thereby preventing detachment of said sheathing during seismic events and strong winds.

9. The connector of claim 6 wherein said sheathing tab having a location disposed near the edge of said main plate as a means for attachment to one or more edges of said sheathing, forming said wall into a strong shear wall.

10. The connector of claim 6 wherein said plate tab, said main plate, and said plate web having said right angle bends, a predetermined area, and a plurality of nail holes as a means for forming a strong box section on three sides of said top plate and having attaching means to said top plate thereby preventing beams of said top plate from separating.

11. The connector of claim 6 wherein said rafter web and said stud tab having said right angle bends forming said rafter web and said stud tab parallel and planar to each other.

12. The connector of claim 6 wherein said rafter web and said stud tab having a plurality of nail holes and said right angle bends as a means for placement and attaching means against the wide side of a rafter and wall stud, thereby forming a direct load path between said rafter and said wall stud.

13. A metal connector for securing a rafter, top plate, wall stud, and wall sheathing comprising:
   a. a generally flat main plate;
   b. a first generally right angle bend on said flat plate forming a plate tab;
   c. a second generally right angle bend adjacent and perpendicular to said first bend forming a rafter web;
   d. a third generally right angle bend on said flat plate, opposite said first right angle bend, forming a plate web;
   e. a fourth generally right angle bend, adjacent and perpendicular to said third right angle bend, forming a stud tab;
   f. said rafter web and said stud tab, each having a right angled bend forming triangular shaped gussets.

14. The connector of claim 13 wherein said gussets having a predetermined area and a generally right angled bend as a means of placing each of said gussets perpendicular to said rafter web and said plate web, and perpendicular to said stud tab and said plate tab respectively, of the connector.

15. The connector of claim 13 wherein said gussets having a generally right angled bend adjacent to each of said gussets forming an anchor tab.

16. The connector of claim 15 wherein each of said anchor tabs having a predetermined area, a nail hole, and attaching means to said plate web, and said plate tab respectively, as a means of forming each of said gussets into braces between said rafter web and said plate web, and between said stud tab and said plate tab respectively.

17. The connector of claim 16 wherein said gussets and attached said anchor tabs having attaching means to structural members of a building as a means for preventing racking of walls during construction, earth tremors, and strong winds.

18. The connector of claim 13 wherein said plate tab, said main plate, and said plate web having said right angle bends, a predetermined area, and a plurality of nail holes as a means for forming a strong box section on three sides of said top plate and having attaching means to said top plate thereby preventing beams of said top plate from separating.

19. The connector of claim 13 wherein said rafter web and said stud tab having said right angle bends forming said rafter web and said stud tab parallel and planar to each other.

20. The connector of claim 13 wherein said rafter web and said stud tab having a plurality of nail holes and said right angle bends as a means for placement and attaching means against the wide side of a rafter and wall stud, thereby forming a direct load path between said rafter and said wall stud.

* * * * *